United States Patent [19]

Veronesi et al.

[11] Patent Number: 5,472,723
[45] Date of Patent: Dec. 5, 1995

[54] PROCESS FOR THE PRODUCTION OF CHILLED READY-TO-EAT PIZZAS

[75] Inventors: Sergio Veronesi, Parma; Ernesto Buriani, Emilia; Guido Calo, Conegliano-Treviso, all of Italy

[73] Assignee: Barilla G. e R. F.lli - Societa per Azioni, Parma, Italy

[21] Appl. No.: 198,492

[22] Filed: Feb. 18, 1994

[30] Foreign Application Priority Data

Feb. 24, 1993 [IT] Italy .................................. MI93A0355

[51] Int. Cl.⁶ .................................................. A21D 6/00
[52] U.S. Cl. ......................... 426/302; 426/305; 426/237; 426/241; 426/523; 426/393
[58] Field of Search ....................................... 426/237, 302, 426/305, 392, 241, 523, 393

[56] References Cited

U.S. PATENT DOCUMENTS

| | | | |
|---|---|---|---|
| 4,318,931 | 3/1982 | Schiffmann et al. | 426/523 X |
| 4,471,000 | 9/1984 | Brown et al. | 426/523 |
| 4,882,191 | 11/1989 | Bastetti et al. | 426/557 |
| 5,066,503 | 11/1991 | Ruozi | 426/241 X |
| 5,149,556 | 9/1992 | Le Viet et al. | 426/523 X |
| 5,277,924 | 1/1994 | Padilla | 426/237 X |
| 5,320,856 | 6/1994 | Veronesi et al. | 426/392 |

*Primary Examiner*—Donald E. Czaja
*Assistant Examiner*—Milton I. Cano

[57] ABSTRACT

A process for the production of ready-to-eat pizzas provides for them to be treated after baking by microwaves and hot air at around 100° C. This treatment ensures that all ingredients of the pizzas are pasteurized and that superficial moisture is removed from each pizza.

10 Claims, 2 Drawing Sheets

PROCESS FOR THE PRODUCTION OF CHILLED READY-TO-EAT PIZZAS

FIELD OF THE INVENTION

The present invention relates to a process for the industrial production of chilled ready-to-eat pizzas, that is to say pizzas which are prepared, packaged and stored at a low temperature for the entire period required to market them (the so-called cold chain for the distribution, display and sale of products in general).

In the following description and in the subsequent claims, the term "pizza" is intended to define a well known and widely consumed food product which includes 1) a base, generally a flattened disc, obtained by kneading a pre-leavened dough of flour and water which incorporates appropriate quantities of yeast and salt and 2) a topping which in general, in more traditional preparations, usually includes tomato, oil, chopped cheese and oregano.

BACKGROUND OF THE INVENTION

It is known that the topping for a pizza may vary greatly according to different consumer tastes and according to the imagination of the maker. Therefore, other ingredients are often added to the basic topping, such as anchovies, tuna, seafoods, olives, artichokes, various chopped vegetables, appropriately sliced sausage products, mushrooms, pickles, cheeses, eggs. The term "ready-to-eat pizza" is intended to refer to a pizza that, once removed from the container in which it had been packaged and stored, requires simply to be heated to be as tasty and appetizing as when it was fresh out of the oven.

For the industrial production of ready-to-eat pizzas as, in general, for the production of other items of ready-to-eat food products, it is necessary to comply with a dual requirement, that is, on the one hand, to ensure that the pizza is non-toxic and keeps well and, on the other hand, to keep the physical and organoleptic properties of the pizza as close as possible to those of freshly prepared pizza straight from the oven.

In order to ensure that food products in general and cooked, ready-to-eat food products in particular are nontoxic and keep well, prior art practices teach that the products should be sterilized or pasteurized by appropriate heat treatments which, in some fortunate cases, may coincide with the cooking processes themselves.

In the case of pizza, non-toxicity and keeping capacity must be ensured for all components (base and toppings) which, it is known, may each have very different natural characteristics and intrinsic behaviour patterns.

In order to prepare a good pizza, that is one which can compare organoleptically with those prepared and eaten immediately in a pizzeria, it is necessary that the base be cooked (in an oven) at a high temperature (350°/400° C.) for a very short time, about 2–3 minutes. When it is taken out of the oven after such treatment, the pizza base has a crispy crust and a moist interior.

However the above heat treatment is not long enough to pasteurize the ingredients of the pizza topping which, as is well known, for this purpose need to be heated throughout to about 90°–95° C. for at least 10 minutes.

If a pizza prepared as in a pizzeria were to be cooled, packaged and kept at a low temperature, for example at 8° C.–10° C. (chilled) it would be entirely unstable from a bacteriological point of view and would need to be disposed of after about 5–6 days owing to an unstoppable growth of bacterial flora.

However, should the above cooking process be lengthened in order to comply with the pasteurizing requirements of the topping ingredients, the base would be too dry and organoleptically unacceptable.

SUMMARY OF THE INVENTION

The problem at the root of the present invention is therefore to devise a process for the industrial production of chilled ready-to-eat pizzas having such functional characteristics that the pizzas obtained thereby are, on the one hand, more than satisfactorily stable from the point of view of health and hygiene over at least the entire period of their chilled storage so as to satisfy well known marketing requirements (distribution, display and sale) and, on the other hand, when heated so as to be eaten are entirely comparable with freshly prepared pizzas just out of the oven (pizzeria pizzas) as far as their organoleptic properties and aroma are concerned.

This problem is solved according to the invention by a process which includes the continuous preparation of pizza bases from a suitably leavened dough of flour and water, incorporating yeast and salt, the arrangement or disposing on each base of a respective topping of several ingredients and the baking of the pizzas thus prepared at 350°–600° C. for 0.5–2 minutes and is characterized in that it includes the steps of:

pasteurizing the baked pizzas in a continuous process in a pasteurizing area by subjecting them simultaneously to microwaves and flows of hot air at 90°–100° C., chilling the pasteurized pizzas to a temperature of between 0° C. and 4° C. in a sterile environment, and packaging the chilled pizzas while maintaining them at the above chilled temperature.

According to a second characteristic of the invention, pizzas leaving the simultaneous microwave and hot air treatment are subjected to advantage to a further hot air treatment at 90°–100° C., lasting 1–3 minutes but without microwaves.

On leaving the baking oven, the pizzas have a crispy crust and a moist interior.

The temperature of the pizzas just out of the oven varies according to the ingredients and components used. Generally, it may vary from 50° C. to 80° C. It should also be noted that the temperature in the middle of the topping components is just as variable, depending on their nature and the size to which they are chopped. In the case of artichokes, for example, the temperature in their middle may average about 60° C.

The subsequent microwave treatment ensures the pasteurization of the toppings without altering the structure and consistency of the base which retains substantially the same properties it had on leaving the baking oven as far as organoleptic properties of aroma and crispness are concerned.

The duration of the microwave treatment varies within the above period according to the nature, consistency and "chopping" of the topping.

The microwaves cause moisture to diffuse, though only to a small extent, from the interior of the base to the surface; however the possible risk of making the pizza itself "rubbery" is countered, and even cancelled, by the flow of hot air which blows onto the pizza from all sides.

In order to make sure this result is obtained, the hot air treatment is continued without microwaves.

The advantages and characteristics of the invention will become clearer from the description which follows, with reference to the appended drawings, provided purely by way of non-limitative example.

DETAILED DESCRIPTION OF THE PREFERRED EMBODIMENTS

A pre-leavened pizza dough, made in an entirely conventional manner from flour and water and incorporating yeast and salt, is divided into rounded shapes of a pre-determined weight which are fed, successively at a pre-determined rate, to a dough rolling assembly, leaving it in the traditional shape and dimensions of pizza bases. Subsequently, preselected toppings are arranged on each pizza base and the pizzas thus composed are fed continuously to a pizza-baking oven 1. Baking in the oven takes place at a temperature of 350°–500° C. and the pizzas remain in the oven for between 0.5 and 2 minutes (baking time), the temperature and time varying within the respective periods according to the type and sizing of the topping.

On leaving the oven 1, the baked pizzas 2 are fed continuously through a tunnel 3 for pasteurization by microwaves and hot air.

To advantage, a synchronization device 19 of known type is arranged between the oven 1 and the tunnel 3, to help ensure the continuity of the passage of the baked pizzas from the oven to the tunnel.

Figure 1:
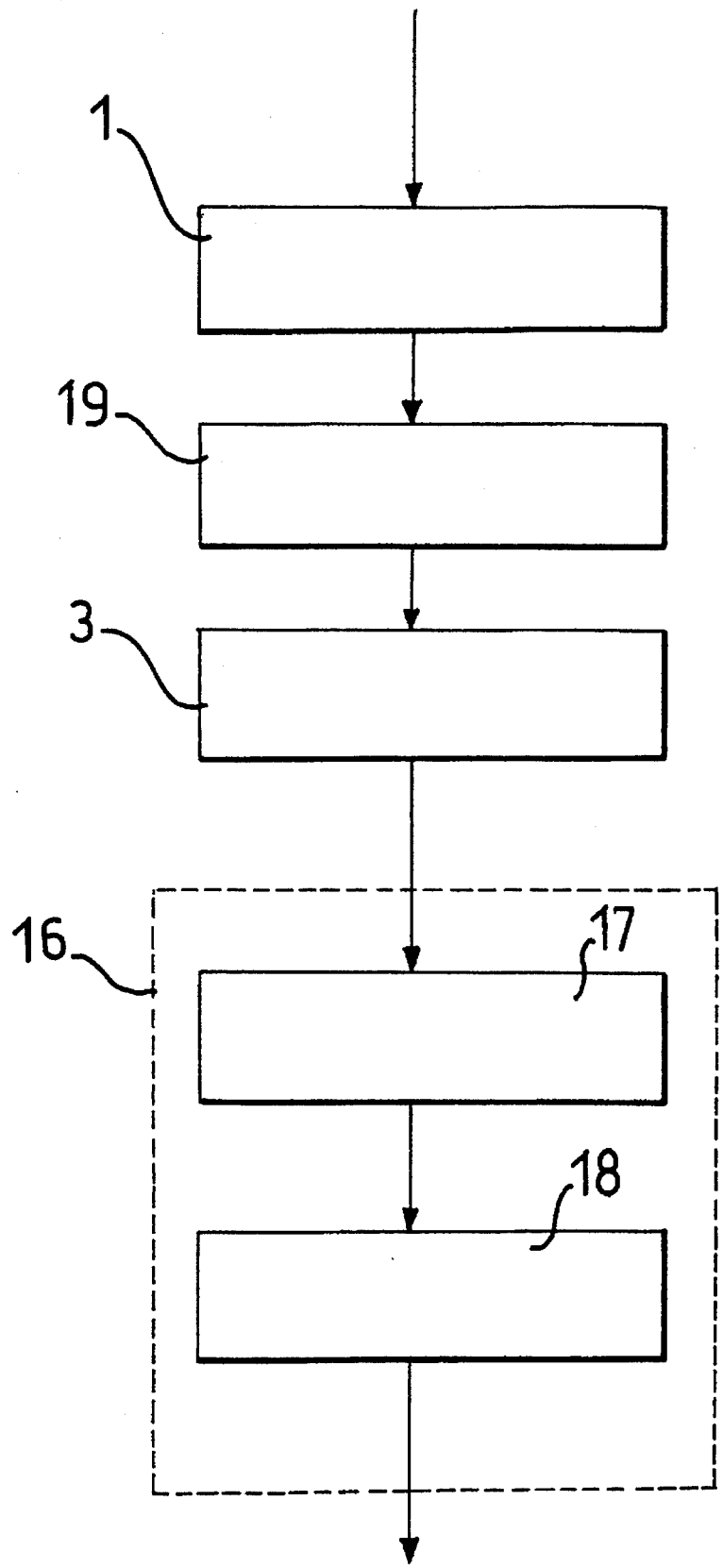
FIG. 1 is a block diagram of a chilled pizza-production line for carrying out the process of the invention.
Figure 2:
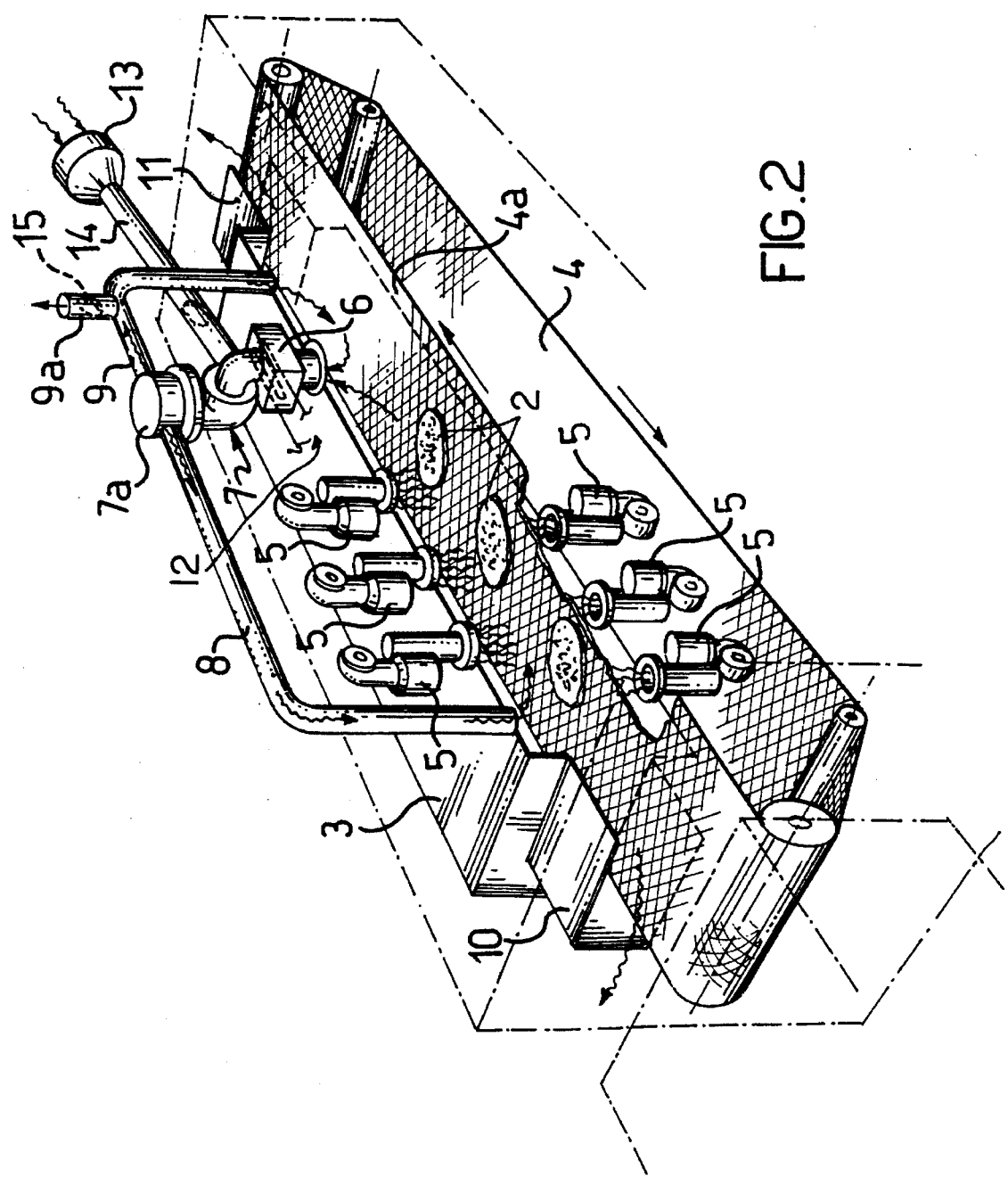
FIG. 2 is a schematic perspective view, on an enlarged scale, of a detail of the chilled pizza-production line of FIG. 1.

With reference to FIG. 2, the tunnel 3 is traversed by the upper pass 4a of a mesh conveyor belt 4 of an appropriate plastic material. Two successive sections are defined in this tunnel 3: a first section equipped with a plurality of microwave sources, all indicated 5; a second section without microwave sources. A suction end 6 of a suction-blower assembly, generally indicated 7, supported outside the tunnel 3 in a conventional manner which is not shown, opens into the tunnel 3 between the first section and the second section. A delivery 7a of the assembly 7 is divided into two ducts 8, 9 which are in fluid communication with the interior of the tunnel 3, near its intake region 10 and near its output region 11 respectively. These regions 10, 11 are shaped so as effectively to absorb the microwaves.

The air heating means provided in the assembly 7 are schematically and generally indicated 12, while a total filter arranged at the opening of a reintegrating air duct 14, in communication with the suction side of the assembly 7, is generally indicated 13.

The air sucked from the tunnel 3 is heated and blown into the tunnel itself at the start of the microwave treatment section and at the end of the section without microwaves respectively. The air speed is about 7–15 meters per second so that inside the tunnel 3 there is always a minimum overpressure of 2–3 mm of water. The air blown into the tunnel 3 is preferably sterile air at a temperature which ensures that there is a temperature of 90°–100° C. in the heating chamber.

In the first section of the tunnel, the baked pizzas are subjected simultaneously to a flow of sterile hot air and microwaves. In this first section the pizzas are heated to the pasteurization temperature and the pasteurization process begins, in particular the pasteurization of the topping ingredients. At the same time, the moisture is blown from the surface of the pizzas so as to maintain the crust crunchy and crisp, as it was on leaving the baking oven. In the subsequent section of the tunnel 3, without microwave sources, the further treatment with hot sterile air completes the removal of moisture and the desired pasteurization process. The humid air sucked up by the assembly 7 is discharged into the atmosphere through the duct 9a which is provided with appropriate valve means, schematically indicated 15.

From the pasteurization tunnel the baked and pasteurized pizzas are fed continuously to a sterile chamber 16 where they are first cooled in sterile conditions, for example by conventional temperature reducers, schematically indicated 17, and then passed for so-called primary packaging by a packaging machine 18, of a conventional type, suitable for operation in a sterile environment.

The pizzas are then chilled to a temperature in the range 0° C. to 8° C. and packaged, ready for final storage at the above temperature.

Under these conditions, the pizzas will keep more than satisfactorily both from the point of view of stability and non-toxicity and from the point of view of their organoleptic properties for between 20–25 days, a period which is more than long enough for them to be marketed through a so-called cold chain.

Once warmed in a domestic oven at a temperature of between 150° C.–180° C. for 5–8 minutes, the pizzas are entirely comparable to freshly prepared ones just out of the oven.

What is claimed is:

1. A process for the industrial production of chilled ready-to-eat pizzas comprising the steps: continuously preparing pizza bases from leavened dough of flour and water, incorporating yeast, disposing on each base a topping to form pizzas, baking the pizzas, thus prepared in an oven at 350°–360° C. for a period of 1–1.5 minutes, transporting said pizzas from said oven into pasteurizing area;

pasteurizing the topping in a continuous process, by subjecting the pizzas simultaneously to microwaves and a flow of hot air at 90°–100° C., chilling the pizzas to a temperature between 0° C. and 8° C. in a sterile environment and packaging the chilled pizzas while maintaining them at the above chilling temperature.

2. A process according to claim 1, wherein the pasteurization step is followed by a step of treating the pasteurized pizzas with a flow of hot air at 90°–100° C., without microwaves.

3. A process according to claim 2, wherein the steps of pasteurizing the pizzas and treating them with hot air without microwaves are carried out in a single tunnel environment, the air being sterile and overpressured.

4. A process according to claim 2, wherein the pasteurization step is carried out for a period of between 1 and 2.5 minutes, with the subsequent step of treatment with sterile hot air being carried out for 1–3 minutes.

5. A process for production of a chilled ready-to-eat pizza, each formed of a base and a topping of one or more ingredients thereon, comprising the steps:
 a. preparing a pizza base from dough including flour, water and yeast,
 b. disposing on the base a topping, thus forming a pizza,
 c. baking said pizza in an oven at a temperature in the range of 350°–600° C. for a time period in the range of 1–1.5 minutes,
 d. transporting said pizza from said oven into a pasteurizing area,
 e. pasteurizing said topping of said pizza by subjecting it to microwaves and a flow of hot air at a temperature in the range of 90°–100° C. and
 f. chilling said pizza to a temperature in the range of 0°–8° C. while in a sterile environment.

6. A process according to claim 5 wherein said pasteurizing step comprises the further subsequent step of subjecting said pasteurized pizza to a flow of hot air in the range of 90°–100° C. without microwaves.

7. A process according to claim 6 wherein said air flows are at a pressure greater than atmosphere.

8. A process according to claim 7 wherein said air flows are at a pressure in the range of 2–3 mm of water.

9. A process according to claim 7 wherein said air flows have speed in the range of 7–15 meters per second.

10. A process according to claim 6 wherein said pasteurization step is conducted for a time period in the range of 1–2.5 minutes, and said subsequent hot air flow step is conducted for a time period in the range of 1–3 minutes.

* * * * *